Aug. 7, 1951      E. J. HUBER      2,563,114
BRACKET SUPPORTED FOLDING SEAT
Filed May 24, 1947
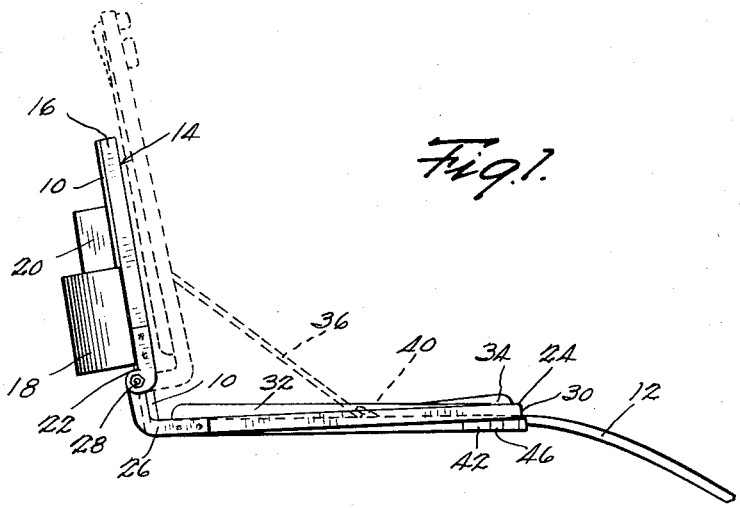
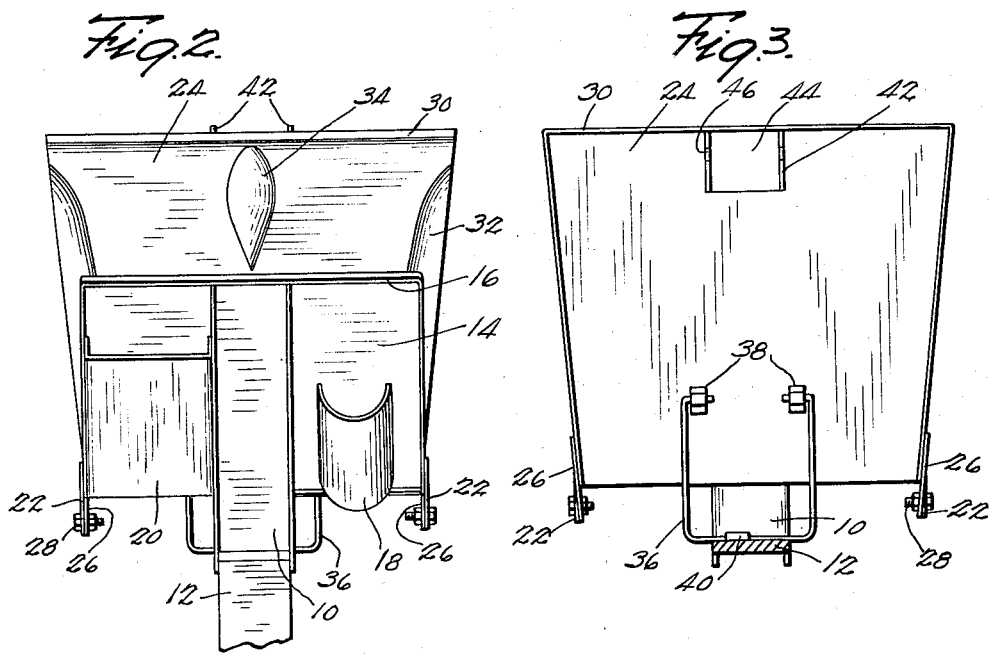
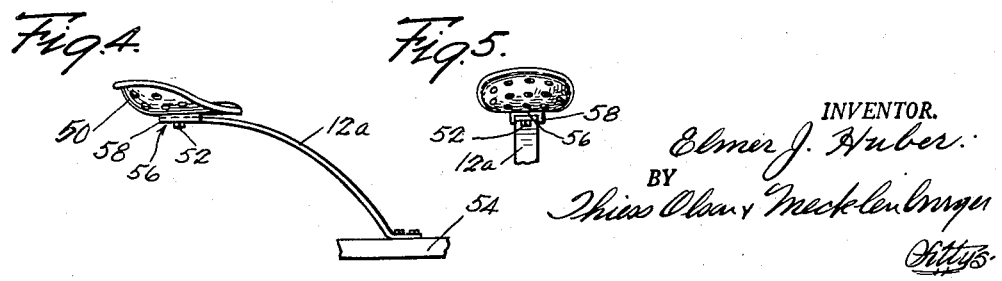
INVENTOR.
Elmer J. Huber.

Patented Aug. 7, 1951

2,563,114

UNITED STATES PATENT OFFICE 2,563,114

BRACKET SUPPORTED FOLDING SEAT

Elmer J. Huber, Joliet, Ill., assignor to F. Willis McGuire and Julius Ruben, Chicago, Ill., as trustees Application May 24, 1947, Serial No. 750,229

9 Claims. (Cl. 155—51)

This invention relates to a seat construction and more particularly to a seat construction useful for mounting on vehicles, such as tractors or similar automotive equipment.

Seat constructions for tractors and other automotive equipment or vehicles used around the farm, for example, are ordinarily mounted directly on a frame bar or cantilever spring of the vehicle. Possibly one of the most usual types of seats for vehicles of this character is an ordinary bucket seat bolted directly to the upper end of the frame bar of the vehicle by means of a single center bolt. Such seats, after a period of use, have a tendency to work loose and move out of alignment with the frame of the vehicle. Also during the operation of equipment of this character it is desirable that the operator change positions from time to time in order to gain relaxation or for other purposes and steps or other foot rests are usually provided so that the operator may assume a standing position. However, in the usual type of seat construction the presence of the rigidly mounted seat member interferes with the operator when he attempts to continue the operation of the vehicle from a standing position.

Accordingly it is one object of this invention to provide a seat construction for a tractor or other vehicle which may be readily moved out of the way when the operator desires or is required to assume a standing position.

A further object of this invention is the provision of a seat construction having a back portion and a seat member wherein the seat member may be raised out of the way of the operator when he is standing and which may be releasably locked in the raised position.

A further object of this invention is the provision of a foldable seat construction in which, when the seat member is in a lowered position of use, alignment of the seat member with the frame bar of the vehicle is insured.

A still further object of this invention is the provision of a readily releasable latch means for securing the seat member in a raised nonuse position.

An additional object of this invention is the provision of means for insuring the alignment of the seat with the frame of the vehicle.

Further and additional objects will appear from the following specification, the accompanying drawing and the appended claims.

In carrying out this invention in one form, a seat supported on a frame bar of a vehicle is provided which comprises an upstanding back member rigidly secured to the frame bar, a seat member supported by the frame bar when in a lowered position of use, and a back rest of substantially the same width as the seat member rigidly secured to the back member, the rear end of said seat member being pivoted adjacent the lower extremity of said back rest for movement to a raised nonuse position toward the back rest. A latch is provided on the upper surface of the frame bar and a substantially U-shaped rod pivoted at each end to the underside of the seat member is provided and arranged so that the closed end of the U-shaped rod depending from the seat member is adapted to cooperate with the latch for releasably locking the seat member in the raised position. In order that the alignment of the seat member with the frame bar may be insured when the seat member is in the position of use, there are provided a pair of frame bar embracing members depending from the under side of the seat member adjacent the front portion thereof. These frame bar embracing members may comprise a pair of parallel plates extending in planes perpendicular to the plane of the seat member and parallel to the longitudinal axis of the frame bar.

One important feature of the present invention is the provision of a seat member that may be readily moved out of the way of the operator when he desires or is required to assume a standing position including means for releasably locking the seat member in the raised position. Another important feature of the present invention to the provision of frame bar embracing members to insure the alignment of a seat member with the frame bar of the vehicle.

For a more complete understanding of this invention reference will now be made to the accompanying drawing, wherein Fig. 1 is a side elevational view of a tractor seat embodying the present invention showing the seat member in the lowered position of use in full lines and in the raised position of nonuse in dotted lines;

Fig. 2 is a rear elevational view of the construction shown in Fig. 1 with the seat member in a raised position of nonuse;

Fig. 3 is a front elevational view of the same device also showing the seat member in the raised position;

Fig. 4 is a side elevational view of a bucket seat showing means for insuring the alignment thereof with the frame of the vehicle formed in accordance with another embodiment of this invention, and Fig. 5 is a rear elevational view of the construction shown in Fig. 4.

As shown in Figs. 1 to 3, the seat comprises a back member 10 which may constitute an integral continuation of, or may be rigidly secured by welding or otherwise to, a substantially horizontal portion of a frame bar 12 which extends upwardly from the frame of any suitable vehicle (not shown). A back rest 14 having a rearwardly extending peripheral flange 16 is rigidly secured by welding or otherwise to the back member 10. If desired, suitable receptacles 18 and 20 for tools or other articles may be secured to the rear face of the back member 10 or the back rest 14. A pair of apertured brackets 22 are welded or otherwise secured to the flange 16 of the back rest 14 and depend from the opposite sides thereof and a seat member 24 of substantially the same width as the back rest 14 is pivotally secured to the brackets 22 by suitable rearwardly and upwardly extending brackets 26 and pivot bolts 28. As shown, the pivot bolts 28 and the brackets 22 and 26 are constructed and arranged so that the seat member 24 may be swung upwardly toward the back member 10 and the back rest 14 to a general upright nonuse position. The seat member 24 is provided with a depending flange 30 along the sides and the front edge thereof and when the seat member is in the normal lowered position of use it is supported directly on the frame bar 12 by means of the front flange 30 bearing thereagainst. It will be noted that in the construction illustrated in the drawings no flange depends from the rear edge of the seat member 24 so that the rear edge of the main body portion of the seat member bears directly against the frame bar. As shown, the upper surface of the seat member 24 may be provided with a plurality of body-conforming portions 32 and 34.

In order that the seat member 24 may be releasably locked in the raised position of nonuse, there is provided a U-shaped rod 36 which is pivoted at each end to the underside of the seat member by means of suitable brackets 38. The closed end portion of the U-shaped rod extends transversely of the frame bar and is adapted to engage a latch 40 extending upwardly from the horizontal surface of the frame bar 12. The latch may be formed integrally with the frame bar if desired. It will be noted that the brackets 38 defining the pivot line for the U-shaped rod 36 are spaced somewhat to the rear of the center of the seat member 24. This is desired since when the seat member is moved to the lowered position the U-shaped rod 36 does not project out beyond the front edge of the seat member and is completely concealed by the seat member and the depending flange 30.

In order that alignment of the seat member with the frame bar may be insured when the seat member is in the lowered position of use, a pair of frame bar embracing members 42 are provided which comprise the side walls of a channel member 44 welded or otherwise secured in an inverted position to the underside of the seat member 24 and toward the front end edge thereof. These frame bar embracing members or plates 42 extend in parallel relationship to the main axis of the frame bar 12 and substantially perpendicular to the plane of the seat member 24. The plates 42 are provided with slots 46 to accommodate the closed end of the U-shaped rod 36 when the seat is in the lowered position of use.

It is believed that the foregoing description clearly indicates the advantages to be gained by the employment of a seat construction of the character described. In the normal position of use the seat member is directly supported by the frame bar 12 and is held in alignment by the frame bar embracing plates 42 assisted in part by the attachment of the seat member to the brackets 22 secured to the back rest 14. The U-shaped rod and latch are concealed by the seat member when it is in the lowered position. If, however, the operator of the vehicle desires or is required to stand, he may do so on suitable steps or footholds (not shown) and may readily raise the seat member 24 by hand to a position of nonuse. The seat member is automatically locked in this position by the closed end of the U-shaped rod 36 riding along the upper surface of the frame bar 12 and over the latch 40. The cooperation of the rod 36 and the latch 40 prevents the seat from falling to the lowered position until such time as the rod 36 may be manually lifted over the latch 40 by the operator and the seat member pulled forward.

As previously indicated, an important feature of the present invention is the provision of frame bar embracing means for insuring that the seat member 24 will remain in alignment with the longitudinal axis of the frame bar 12. As indicated, this feature of the invention is useful in the type of seat construction specifically described in the foregoing. However, it also may be of use in connection with the usual bucket seat for a tractor or vehicle which comprises essentially a dish-shaped seat member secured directly to the frame of the vehicle by means of a center bolt. In this type of construction the center bolt has a tendency to work loose, resulting in wobbling and throwing the seat member out of alignment. By the provision of frame bar embracing means of the character contemplated herein, the misalignment and excess wobbling of vehicle seats of this character are substantially prevented.

Reference is now made to Figs. 4 and 5 showing a bucket seat of this type having frame-bar embracing means associated therewith. The bucket seat 50 is directly secured to one end of a cantilever spring or frame bar 12a by a center bolt 52 extending therethrough, the frame bar 12a being rigidly mounted on a frame 54 of any suitable vehicle (not shown). An inverted channel member 56 having frame bar engaging side walls or flanges 58 is welded or otherwise secured to the bottom of the bucket seat and is provided with an aperture through which the center bolt 52 extends. It will be noted that the alignment bucket seat 50 with the frame bar 12a is insured by the frame bar engaging flanges even though the bolt 52 may become loosened after a period of use.

While two particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A seat comprising a substantially horizontal frame bar, an upstanding back member rigidly secured to said frame bar, a seat member supported on an upper surface of said frame bar in position of use, means pivoting said seat member for movement relative to said frame bar to a raised nonuse position toward said back member, a latch on said frame bar, and latch engaging means pivotally mounted on the underside of said seat member for cooperation with said latch to lock said seat member in the raised position.

2. A seat comprising a substantially horizontal frame bar, an upstanding back member rigidly secured to said frame bar, a seat member supported on an upper surface of said frame bar in position of use and pivoted to said back member for movement to a raised nonuse position toward said back member, a latch on the upper surface of said frame bar, and latch engaging means pivotally mounted on the underside of said seat member for cooperation with said latch to lock said seat member in the raised position.

3. A seat comprising a substantially horizontal frame bar, an upstanding back member rigidly secured to said frame bar, a seat member supported on an upper surface of said frame bar in position of use and pivoted to said back member for movement to a raised nonuse position toward said back member, a latch on the upper surface of said frame bar, and a substantially U-shaped rod pivoted at each end to the underside of said seat member, the closed end of said rod cooperating with said latch to lock said seat member in the raised position.

4. A seat comprising a substantially horizontal frame bar, an upstanding back member rigidly secured to said frame bar, a seat member supported on an upper surface of said frame bar in position of use, a back rest of substantially the same width as the seat member rigidly secured to said back member, means pivoting said seat member for movement relative to said frame bar to a raised nonuse position toward said back member, a latch on said frame bar, and latch engaging means pivotally mounted on the underside of said seat member for cooperation with said latch to lock said seat member in the raised position.

5. A seat comprising a substantially horizontal frame bar, an upstanding back member rigidly secured to said frame bar, a seat member supported on an upper surface of said frame bar in position of use, a back rest of substantially the same width as the seat member rigidly secured to said back member, means pivoting said seat member along a line adjacent the lower extremity of said back rest for movement relative to said frame bar to a raised nonuse position toward said back member, means for releasably locking said seat member in the raised nonuse position, and a pair of frame bar embracing members rigidly secured to the underside of said seat member adjacent its forward edge for insuring alignment thereof with said frame bar when said seat member is in the use position.

6. A seat comprising a substantially horizontal frame bar, an upstanding back member rigidly secured to said frame bar, a seat member supported on an upper surface of said frame bar in position of use, means pivoting said seat member for movement relative to said frame bar to a raised nonuse position toward said back member, means for releasably locking said seat member in the raised nonuse position, and a pair of frame bar embracing members rigidly secured to the underside of said seat member adjacent its forward edge for insuring alignment thereof with said frame bar when said seat member is in the use position.

7. A seat comprising a substantially horizontal frame bar, an upstanding back member rigidly secured to said frame bar, a seat member supported on an upper surface of said frame bar in a lowered position of use, a back rest of substantially the same width as the seat member rigidly secured to said back member, the rear end of said seat member being pivoted along a line adjacent the lower extremity of said back rest for movement relative to said frame bar to a raised nonuse position toward said back member, a latch on the upper surface of said frame bar, a substantially U-shaped rod pivoted at each end to the underside of said seat member, the closed end of said rod depending from said seat member when the latter is in the raised position and adapted to cooperate with said latch for releasably locking said seat member in the raised position, and a pair of frame bar embracing members depending from the underside of said seat member adjacent the front end thereof for insuring alignment of said seat member with said frame bar when said seat member is in the lowered position of use.

8. The seat recited in claim 7 wherein said substantially U-shaped rod is pivoted somewhat rearwardly of the center of said seat member whereby it is completely concealed thereby when in the lowered position of use.

9. The seat recited in claim 7 wherein said substantially U-shaped rod is pivoted somewhat rearwardly of the center of said seat member whereby it is completely concealed thereby when in the lowered position of use, wherein said frame bar embracing members comprise a pair of parallel plates extending in planes perpendicular to the plane of the seat member and parallel to the longitudinal axis of the frame bar, and wherein said plates are slotted for receiving the closed end of said rod when said seat member is in the lowered position.

ELMER J. HUBER.

REFERENCES CITED

The following references are of record in the file of this patent:

UNITED STATES PATENTS

| Number | Name | Date |
| --- | --- | --- |
| 201,561 | Simonson | Mar. 19, 1878 |
| 533,300 | Josselyn | Jan. 29, 1895 |
| 773,695 | Walker | Nov. 1, 1904 |
| 1,987,851 | Holman | Jan. 15, 1935 |
| 2,298,450 | Baker | Oct. 13, 1942 |